United States Patent [19]

Daniels

[11] 3,879,375

[45] Apr. 22, 1975

[54] PROCESS FOR THE PREPARATION OF GARAMINE AND DERIVATIVES THEREOF

[75] Inventor: Peter J. L. Daniels, Cedar Grove, N.J.

[73] Assignee: Schering Corporation, Bloomfield, N.J.

[22] Filed: June 26, 1973

[21] Appl. No.: 373,693

[52] U.S. Cl.................. 260/210 R; 260/210 AB
[51] Int. Cl............................................ C07c 129/18
[58] Field of Search.................. 260/210 R, 210 AB

[56] References Cited
UNITED STATES PATENTS

| | | | |
|---|---|---|---|
| 3,719,659 | 3/1973 | Mageilein | 260/210 R |
| 3,795,669 | 3/1974 | Fujimoto et al. | 260/210 AB |

OTHER PUBLICATIONS

Whistler et al., *Methods in Carbohydrate Chem.*, "Barry Degradation," Vol. 5, pages 382–392, Acad. Press, N.Y. (1965).

*Primary Examiner*—Johnnie R. Brown
*Assistant Examiner*—Cary B. Owens
*Attorney, Agent, or Firm*—Mary S. King; Stephen B. Coan

[57] ABSTRACT

Amino-protected derivatives of garamine (useful intermediates) are prepared by treating a pseudotrisaccharide having a garamine moiety glycosidically linked to another pyranoside sugar possessing vicinal hydroxyl groups (preferably vicinal trans diequatorial hydroxyl groups), said pseudotrisaccharide having amino-protecting groups (preferably acetyl or benzoyl) with a glycol cleaving reagent (preferably sodium meta-periodate) and then treating the secodialdehyde derivative thereby formed with a phenylhydrazine and a lower alkanoic acid in water. Typical starting compounds include the per-N-acetyl derivatives of Antibiotic JI-20 Complex and the per-N-acetyl derivatives of a gentamicin mixture comprising gentamicins B, $B_1$ and $X_2$.

14 Claims, No Drawings

PROCESS FOR THE PREPARATION OF GARAMINE AND DERIVATIVES THEREOF

FIELD OF INVENTION

This invention relates to a novel process and to novel intermediates useful therein.

More specifically, this invention relates to a novel process for preparing garamine and amino-protected derivatives thereof, such compounds being pseudodisaccharides useful as intermediates, from pseudotrisaccharides, and to novel intermediates produced thereby.

In particular, this invention relates to the preparation of 1,3,3'-tri-N-substituted garamine from a pseudotrisaccharide having a garamine moiety glycosidically linked to another pyranoside sugar possessing vicinal hydroxyl groups, said pseudotrisaccharide having amino-protecting groups, and to novel seco-dialdehyde intermediates produced thereby.

PRIOR ART

Garamine, a pseudodisaccharide having antibacterial activity and also being useful as an intermediate, and 1,3,3'-tri-N-substituted garamines, useful for producing pseudotrisaccharide antibacterial agents such as gentamicin $X_2$, are described in co-pending application Ser. No. 296,434, filed Oct. 10, 1972, and now abandoned of Alan K. Mallams for NOVEL INTERMEDIATES AND METHODS FOR PRODUCING GENTAMICIN $X_2$. The method described and claimed therein for preparing 1,3,3'-tri-N-substituted garamine (and specifically 1,3,3'-tri-N-carbobenzyloxygaramine) comprises selectively hydrolyzing by means of an acid, a pseudotrisaccharide having the garamine moiety and a hex-4-enopyranoside moiety (e.g. sisomicin), said pseudotrisaccharide having N-protected groups (preferably carbobenzyloxy). The 1,3,3,'-tri-N-substituted garamine thereby produced (e.g. 1,3,3'-tri-N-carbobenzyloxygaramine) is then convertible to garamine via conventional deblocking methods, such as alkaline hydrolysis.

My invention provides an alternate method for preparing amino-protected garamine derivatives from different starting compounds, i.e. from pseudotrisaccharides having a garamine moiety glycosidically linked to another pyranoside sugar possessing vicinal hydroxyl groups, including known antibiotic pseudotrisaccharides such as Antibiotic G-418, gentamicin B, gentamicin $B_1$, gentamicin $X_2$, Antibiotics JI-20A and JI-20B.

Additionally, by my process a mixture of pseudotrisaccharides having N-protecting groups may be conveniently converted together to produce an amino-protected garamine derivative which is easily isolated from side reaction products and any remaining unreacted pseudotrisaccharide starting compound which did not have the requisite garamine moiety and pyranoside sugar bearing vicinal hydroxyl groups. Thus, my invention provides a method for preparing garamine derivatives which eliminates the necessity of extensive separation and purification of pseudotrisaccharide starting compounds from antibiotic complexes produced by fermentation.

My process utilizes a sequence of reactions similar to those known in the polysaccharide art as the Barry Degradation (O'Colla, P.S. : The Barry Degradation; Methods in Carbohydrate Chemistry, V pp. 382–392, Academic Press, New York, 1965). However, prior to my invention, it was unknown to selectively degrade off a 2-amino sugar derivative from a polysaccharide via the Barry Degradation method.

GENERAL DESCRIPTION OF THE INVENTION

In the process sought to be patented, a pseudotrisaccharide having a garamine moiety glycosidically linked to another pyranoside sugar which possesses vicinal hydroxyl groups, said pseudotrisaccharide having amino-protecting groups, is treated with a glycol cleaving reagent whereby oxidative fission of the pyranoside sugar moiety occurs between the vicinal hydroxyl groups to produce a seco-dialdehyde derivative, which, upon treatment with a hydrazine selected from the group consisting of phenylhydrazine and a substituted phenyl hydrazine together with a lower alkanoic acid in water, produces a 1,3,3'-tri-N-substituted garamine which, upon alkaline hydrolysis, is converted to garamine.

Preferred as starting compounds for my process are pseudotrisaccharides wherein the pyranoside sugar glycosidically linked to the garamine moiety possesses vicinal hydroxyl groups which are trans diequatorial to each other including aminoglycosides such as gentamicins B, $B_1$, $X_2$, Antibiotic G-418, Antibiotic JI-20A, Antibiotic JI-20B and mixtures thereof.

Glycol cleaving reagents useful in my process include lead (IV) salts, e.g. lead tetraacetate and phosphatolead-(IV)-acids, and periodate salts, preferably sodium meta-periodate.

The hydrazine reagent preferably used in my process is phenylhydrazine. Other hydrazine reagents which may be used are phenylhydrazines substituted by groups such as methyl, nitro or halogen, including reagents such as p-bromophenylhydrazine, 2,4-dinitrophenylhydrazine, o-nitrophenylhydrazine, m-nitrophenylhydrazine, p-nitrophenylhydrazine, o-tolylhydrazine, m-tolylhydrazine, p-tolylhydrazine, 2,3-xylylhydrazine, and 2,5-xylylhydrazine.

My process is usually carried out in a non-reactive solvent in which the starting pseudotrisaccharide and glycol cleaving reagent and hydrazine reagent are soluble. By "non-reactive" is meant a solvent which will not react with the pseudotrisaccharide or the reagents so as to cause transformations which will result in competing side reactions. When using a lead salt as cleaving reagent, my process is usually carried out in an organic solvent such as lower alkanols and, preferably, lower alkanoic acids. When utilizing a periodate as cleaving reagent, water is the solvent of choice, although a lower alkanol may also be used.

The term "amino-protecting groups" as used in this specification and in the claims is well known in the art. Exemplifying such groups which are useful in my process are unsubstituted and functionally substituted acyl groups including lower alkanoyl groups such as acetyl and propionyl and aroyl groups such as benzoyl and xyloyl, and aralkanoyl groups such as phenylacetyl. Amino-protecting groups particularly preferred for the process of this invention are acetyl and benzoyl.

Garamine and 1,3,3'-N-substituted garamine, the pseudodisaccharides produced by my process, as described in copending application Ser. No. 296,434, filed Oct. 10, 1972, may be represented by the following formula I:

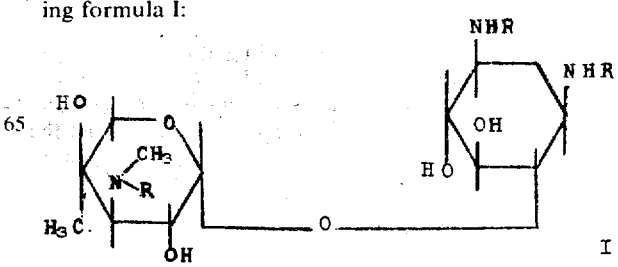

wherein R is an amino-protecting group or hydrogen.

When R is hydrogen, the pseudodisaccharide having the chemical structure O-3-deoxy-4-C-methyl-3-methylamino-β-L-arabinopyranosyl-(1 → 6)-2-dexoy-D-streptamine as set forth in above formula I, has been named "garamine", which compound possesses antibacterial activity per se, being useful in treating conditions caused by *S. aureus, E. coli, P. aeruginosa* and other pathogenic organisms.

Compounds of formula I wherein R is an amino-protecting group (preferably acetyl or benzoyl in the process of this invention) are termed amino-protected derivatives of garamine and are the compounds directly produced by my process. These derivatives may be used as is as intermediates for preparing trisaccharides utilizing either the Koenigs-Knorr or the Lemieux reactions with a monosaccharide as the other reagent. For example, gentamicin $X_2$ a known antibacterial agent, may be prepared from 1,3,3,'-tri-N-acetylgaramine and the monosaccharide 3,4,6-tri-O-acetyl-2-deoxy-2-nitrosoα-D-glucopyranosyl chloride via the well-known Lemieux procedure followed by reduction and removal of the blocking groups. Alternatively, 1,3,3'-tri-N-acetylgaramine may be converted to O-protected derivatives thereof also useful in the synthesis of antibacterials.

Additionally, amino-protected garamine derivatives of formula I prepared according to the process of this invention, e.g. 1,3,3'-tri-N-acetylgaramine and 1,3,3'-tri-N-benzoylgaramine, may be "deblocked" via alkaline hydrolysis and the garamine thereby produced may be converted utilizing known techniques to another amino-protected derivative, e.g. to the 1,3,3'-tri-N-carbobenzyloxygaramine, which may be more desirable for use in a given sequence of reactions.

Particularly useful amino-protected pseudotrisaccharide starting compounds for the process of this invention are aminoglycosides represented by the following formula II and mixtures thereof:

glycosides having a garamine moiety glycosidically linked to a pyranoside sugar bearing vicinal trans diequatorial hydroxyl groups.

The amino-protected derivatives represented by formula II are derived utilizing known techniques from aminoglycosides of formula II wherein R is hydrogen, including Antibiotic G-418 (compound of formula II wherein R is hydrogen, $R_1$ is methyl, $R_2$ is hydroxyl, X is amino) which is described in Belgian Patent No. 787,758 granted February 19, 1973; the well known gentamicin B (R and $R_1$ are hydrogen, $R_2$ is amino, X is hydroxyl), gentamicin $B_1$ (R is hydrogen, $R_1$ is methyl, $R_2$ is amino, X is hydroxyl), and gentamicin $X_2$ (also known in the art as gentamicin X) (a compound of formula II wherein R and $R_1$ are hydrogen, $R_2$ is hydroxyl and X is amino); and Antibiotics JI-20A and JI-20B (R is hydrogen, $R_1$ is hydrogen and methyl, respectively, $R_2$ and X are each amino) which are described in copending application Serial No. 261,753, filed June 12, 1972 of Jan Ilavsky, Aris P. Bayan, William Charney and Hans Reimann for NEW ANTIBIOTIC FROM MICROMONOSPORA PURPUREA JI-20.

In carrying out my process whereby amino-protected pseudotrisaccharides represented by formula II are degraded to pseudodisaccharides represented by formula I, i.e. to amino-protected garamine derivatives, a pseudotrisaccharide derivative represented by formula II, e.g. 1,3,2',3''-tetra-N-acetylantibiotic G-418 (compound of formula II wherein R is acetyl, $R_1$ is methyl, $R_2$ is hydroxyl and X is acetylamino), is usually first treated with an equivalent quantity of a glycol cleaving reagent, preferably sodium meta-periodate, in water at room temperature until thin layer chromatographic analysis of an aliquot of the reaction solution indicates the absence of starting compound. When a periodate is employed as reagent, the excess periodate and inorganic salts are conveniently removed by precipitation with lead to acetate and, after removing the resultant precipitate by filtration, then removing further inorganic ions by bringing the aqueous filtrate to about $pH^4$ by means of dilute sulfuric acid, and filtering off the re-

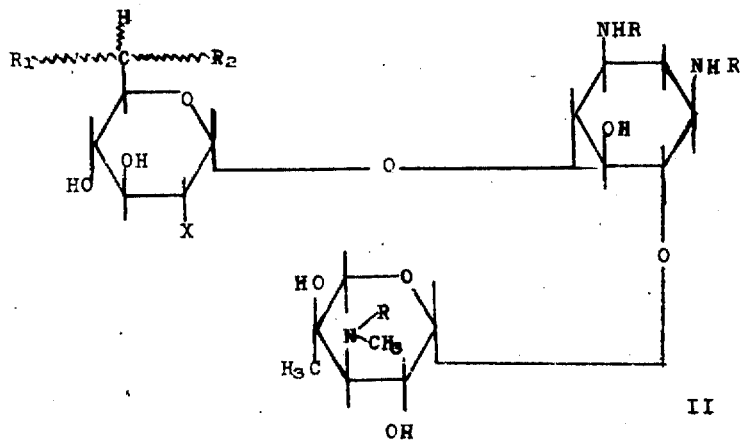

II wherein R is an amino-protecting group as defined hereinabove, preferably acetyl or benzoyl; $R_1$ is a member selected from the group consisting of hydrogen and methyl; $R_2$ and X are each a member selected from the group consisting of hydroxy and —NHR; said aminosulting precipitated inorganic salts. After removal of the periodate and other inorganic salts, there remains an aqueous solution of the secodialdehyde oxidation product which may be represented by the following formula III:

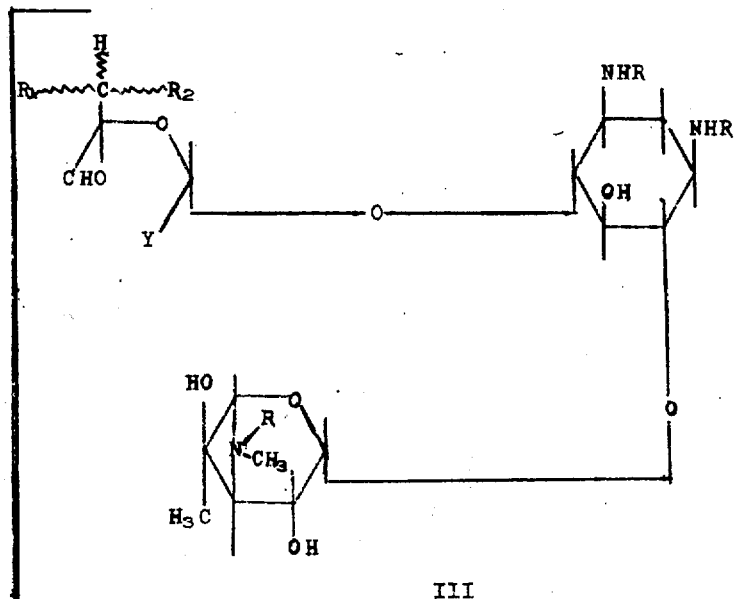

III wherein R, R₁ and R₂ are as defined in formula II and Y is a member selected from the group consisting of —CHO and

In the conversion of the pseudotrisaccharide (II) to the seco-dialdehyde oxidation product (III), there occurs oxidative fission of the original pyranoside sugar moiety between the vicinal hydroxyl groups. Thus, when a starting pseudotrisaccharide possesses three vicinal hydroxyl groups, e.g. compounds of formula II wherein X is hydroxyl such as in gentamicins B and B₁, fission occurs at two places to produce a seco-dialdehyde of formula III wherein Y is —CHO together with formic acid.

In carrying out the process of this invention, it is not necessary to isolate or purify the seco-dialdehyde intermediate III, and the aqueous reaction solution containing the seco-dialdehyde oxidation product is usually immediately treated with a hydrazine reagent, preferably phenylhydrazine, and aqueous acetic acid at temperatures in the range of from about 45° to about 100°C (usually at reflux temperature) until thin layer chromatographic analysis of an aliquot of the reaction solution indicates the absence of starting compound and the presence of mainly 1,3,3'-tri-N-substituted garamine. Isolation of the resulting garamine derivative of formula I is conveniently effected by concentrating the reaction mixture to a small volume, dissolving the residue in a week base (e.g. 2N-ammonium hydroxide) extracting the basic aqueous mixture with an organic solvent (preferably a halogenated hydrocarbon solvent such as chloroform), and concentrating the aqueous solution to a residue comprising a 1,3,3'-tri-N-substituted garamine of formula I which may be purified utilizing known techniques such as extraction, crystallization and chromatography.

When garamine is desired, the amino-protected garamine derivative of formula I may be deblocked by known methods, preferably, alkaline hydrolysis.

The seco-dialdehyde intermediate represented by formula III as set forth hereinabove may exist in one or more acetal or hydrated acetal forms; accordingly, formula III is placed in brackets and it is to be understood that in this specification and in the claims, the term "seco-dialdehyde intermediate of formula II" includes the seco-dialdehyde structure set forth in formula III and any equivalent acetal or hydrated acetal form thereof.

My process may be carried out utilizing a mixture of pseudotrisaccharides comprising aminoglycosides possessing the requisite garamine and other pyranoside sugar having vicinal hydroxyl groups, as well as other compounds not possessing the requisite groups, and there will be produced 1,3,3'-tri-N-substituted garamine which can be easily separated from other compounds via chromatographic techniques. For example, a mixture of pseudotrisaccharides obtained as described in J. Chromatography 70, 171 (1972) by removal of gentamicins A and C from the total antibiotic complex produced in the gentamicin fermentation by Micromonospora purpurea NRRl 2953 (said mixture comprising gentamicins B, B₁ and X₂ together with small quantities of gentamicins A and C) upon conversion to a per-amino-protected mixture (e.g. to a per-N-acetyl pseudotrisaccharide mixture comprising 1,3,6',-3''-tetra-N-acetylgentamicin B, 1,3,6',3''-tetra-N-acetylgentamicin B₁, 1,3,2',3''-tetra-N-acetylgentamicin X₂ together with small quantities of 1,3,2',3''-tetra-N-acetylgentamicin A and 1,3,2',6'',3-''-penta-N-acetylgentamicin C) and treatment of the N-protected mixture according to the process of this invention, yields 1,3,3'-tri-N-substituted garamine (e.g. 1,3,3'-tri-N-acetylgaramine) which is easily separated via chromatographic techniques from side products and residual nonreacting starting pseudotrisaccharides such as gentamicin C.

Similarly, Antibiotic JI-20 Complex (comprising JI-20A and JI-20B) which is produced in the fermentation of Micromonospora purpurea JI-20 (NRRL 5467) and isolated as described in the Preparation and Examples of copending Application U.S. Ser. No. 261,753 filed June 12, 1972, upon conversion to the per-N-acetyl derivative thereof (i.e. to 1,3,2',6',3''-penta-N-acetylantibiotic JI-20 Complex) and thence treatment with sodium meta-periodate followed by treatment of the seco-dialdehyde intermediate thereby produced with phenylhydrazine and acetic acid yields 1,3,3'-tri-N-acetylgaramine.

My process is described in detail for aminoglycoside derivatives having acetyl-N-protecting groups which is a preferred amino protecting group when carrying out the process of this invention. It is to be understood, however, that other lower alkanoyl groups, e.g. propionyl, and aroyl groups, e.g. benzoyl, are also preferred blocking groups for my process.

Procedures are set forth hereinbelow to illustrate the best mode contemplated by applicant for carrying out my invention and are not to be construed as limiting the scope thereof.

PREPARATION 1

Per-N-Lower Alkanoylaminoglycosides

A. 1,3,2',3''-Tetra-N-Acetylantibiotic G-418

To Antibiotic G-418 (2.0 g.) in methanol (100 ml.) add acetic anhydride (5 ml.), then allow the reaction mixture to stand at room temperature for 2.5 hours. Concentrate the solution in vacuo, redissolve the resultant residue in methanol (20 ml.), and add the methanol solution dropwise to 1 liter of anhydrous ether. Separate by filtration the resultant precipitate to obtain 2.5 g. of 1,3,2',3''-tetra-N-acetylantibiotic G-418 as a colorless solid, which, upon thin layer chromatographic analysis on silica ge. G.F. utilizing chloroform:methanol:ammonium hydroxide (1:1:1) as developing solvent shows a single spot more mobile than Antibiotic G-418.

In a manner similar to that described in Preparation 1A treat each of the following aminoglycosides with acetic anhydride in methanol: gentamicin B, gentamicin $B_1$, gentamicin $X_2$, and a mixture comprising the foregoing together with small quantities of gentamicins A and C and other minor components (prepared as described in *J. Chromatogr.* Volume 70, 171–173, (1972).

Isolate and purify each of the resulting products in a manner similar to that described in Example 1A, to obtain, respectively:

1,3,6',3''-tetra-N-acetylgentamicin B as the tetrahydrate; $[\alpha]_D 26 + 119°$ (water), 1,3,6',3''-tetra-N-acetylgentamicin $B_1$ as the trihydrate, $[\alpha]_D 26 + 134°$ (water), 1,3,2',3''-tetra-N-acetylgentamicin $X_2$, and an acetylated gentamicin mixture comprising 1,3,6',-3''-tetra-N-acetylgentamicin B; 1,3,6',3''-tetra-N-acetylgentamicin $B_1$; and 1,3,2',3''-tetra-N-acetylgentamicin $X_2$.

C. 1,3,2',6',3''-Penta-N-Acetylantibiotics JI-20A, JI-20B, and JI-20 Complex

The requisite starting compounds i.e. Antibiotics JI-20A, JI-20B, and JI-20 Complex are prepared as described in Examples 1–3 of copending application U.S. Ser. No. 261,753 filed June 12, 1972 and now abandoned.

1. Add 4 ml. of acetic anhydride dropwise to a stirred solution of 1 gm. of Antibiotic JI-20A in 30 ml. of methanol at 5°C. Stir the reaction mixture at room temperature for 16 hours, then concentrate to about one half volume in vacuo and add dropwise to 50 ml. of stirred diethyl ether. Isolate the resultant precipitate by filtration, dissolve the precipitate in a minimum volume of aqueous methanol and chromatograph on a column of silica gel. Elute with the lower phase of a 1:1:1 chloroform: methanol:ammonium hydroxide solvent system. Monitor fractions by thin layer chromatography, combine those fractions containing penta-N-acetylantibiotic JI-20A, then concentrate the combined fractions to a residue. Dissolve the residue in water, filter, and lyophilize to obtain 1,3,2',6',3''-penta-N-acetylantibiotic JI-20A; m.p. 210–220°C; $[\alpha]_D 26 + 141°$ (water).

2. In similar manner, test each of Antibiotic JI-20B and Antibiotic JI-20 complex (comprising Antibiotic JI-20A, Antibiotic JI-20B and smaller amounts of gentamicin $C_1$, $C_2$ and $C_{1a}$) in methanol and acetic anhydride at room temperature for 16 hours. Isolate each product by filtering the respective reaction solution and pouring each filtrate into stirred ethyl ether. Collect each of the resultant precipitates by filtration, wash with ether and dry in vacuo to obtain respectively:

1,3,2',6',3''-penta-N-acetylantibiotic JI-20B; m.p. 220°–225°C; $[\alpha]_D 26 + 124°$ (water); and 1,3,2',60',3''-penta-N-acetylantibiotic JI-20 complex; m.p. 216°–224°C; $[\alpha]_D 26 + 130°$ (water).

D. In the procedure of Preparations 1A, 1B, and 1C, by substituting other lower alkanoic acid anhydrides (e.g. propionic acid anhydride and caprylic acid anhydride) for acetic acid anhydride, there is formed the corresponding per-N-alkanoyl derivative, e.g. the corresponding per-N-propionyl and per-N-capryloyl derivatives of the compounds of Preparation 1A, 1B, and 1C, respectively.

PREPARATION 2

Per-N-Benzoylaminoglycosides

A. 1,3,6',3''-tetra-N-Benzoylgentamicin B

1. Dissolve 4.82 g. of gentamicin B in 250 ml. of dried pyridine, and cool to 0°C. Add with stirring 21.1 g. of benzoyl chloride, and allow the reaction mixture to stand at room temperature for 24 hours. Evaporate the pyridine in vacuo, dissolve the resultant residue in 500 ml. of chloroform, wash the chloroform solution with aqueous sodium bicarbonate solution, 0.1N sulfuric acid and then saturated sodium chloride solution, dry the washed chloroform solution over sodium sulfate, filter, and evaporate to a resiude. Dissolve the residue in 500 ml. of methanol, treat with a small quantity of sodium methoxide and allow to stand at room temperature for 24 hours. Evaporate the methanol solution in vacuo to a residue, then redissolve the residue in a minimum volume of methanol and add the methanolic solution to a large volume of stirred ether. Filter and dry the resultant precipitate comprising 1,3,6',3''-tetra-N-benzoylgentamicin B.

B. In a similar manner, treat each of the following with benzoyl chloride a pyridine at 0°C followed by sodium methoxide in methanol: gentamicin $B_1$, gentamicin $X_2$, a mixture comprising gentamicins B, $B_1$ and $X_2$, Antibiotic G-418, , Antibiotic JI-20A, Antibiotic JI-20B, and Antibiotic JI-20 complex.

Isolate and purify each of the resultant products in a manner similar to that described hereinabove to obtain respectively 1,3,6',3''-tetra-N-benzoylgentamicin $B_1$; 1,3,2',3''-tetra-N-benzoylgentamicin $X_2$; a product mixture comprising tetra-N-benzoylgentamicins B, $B_1$ and $X_2$; 1,3,2',3''-tetra-N-benzoylantibiotic G-418; 1,-3,2',6',3''-penta-N-benzoylantibiotic JI-20A; 1,3,2',6-',3''-penta-N-benzoylantibiotic JI-20B; 1,3,2',6',3''-penta-N-benzoylantibiotic JI-20 complex.

C. In the procedures of Preparations 2A and 2B, by substituting other aroyl halides, e.g. p-toluoyl bromide and xyloyl chloride, for benzoyl chloride, there is formed the corresponding per-N-aroyl derivative, e.g. the corresponding per-N-toluoyl and the corresponding per-N-xyloyl derivatives of the compounds of Preparations 2A and 2B.

EXAMPLE 1

Preparation of 1,3,3'-tri-N-acetylgaramine from Tetra-N-Acetylantibiotic G-418

A. Periodate oxidation of Tetra-N-acetylantibiotic G-418

To a stirred solution of 1 g. of 1,3,2',3''-tetra-N-acetylantibiotic G-418 in 100 ml. of water, add 1 equivalent of sodium meta-periodate (0.321 g.). Stir the solution at room temperature overnight or until thin layer chromatographic analysis of an aliquot of the reaction solution on silica gel G. F. with chloroform:methanol:ammonium hydroxide (1:1:1) as developing solvent shows the absence of starting material. To the reaction solution, add dropwise 5 ml. of a 10 percent aqueous solution of lead diacetate. Remove the resultant inorganic precipitate by filtration, then treat the resultant filtrate with 0.1N sulfuric acid (15 ml.) until the solution is at about ph 4. Separate by filtration the resultant inorganic precipitate to obtain an aqueous solution containing the seco-dialdehyde derivative of tetra-N-acetylantibiotic G-418, represented by the following formula 1A:

hydroxide, then extract the aqueous solution with three 35 ml. portions of chloroform. Concentrate the washed aqueous layer in vacuo to a residue comprising 1,3,3'-tri-N-acetylgaramine.

Purify by column chromatography (2.5 by 60 cm.) utilizing 90 g. of silica gel previously conditioned by contact with the lower phase of a solvent mixture comprising chloroform:methanol:ammonium hydroxide (2:1:1). Dissolve the tri-N-acetylgaramine prepared as described above in a minimum volume of the lower phase of the solvent mixture comprising chloroform:methanol:ammonium hydroxide (2:1:1) and place this solution on the silica gel column, eluting with chloroform:methanol:ammonium hydroxide (2:1:1). Monitor the eluates by thin layer chromatography on silica plates (250 microns), developing by spraying with 5 percent sulfuric acid in methanol and charring. Combine like fractions comprising pure 1,3,3'-tri-N-acetylgaramine and evaporate the combined fractions in vacuo to a residue comprising 1,3,3'-tri-N-acetylgaramine; $[\alpha]_D 26 + 102.9$ (0.3% in methanol); yield = 264 mg.

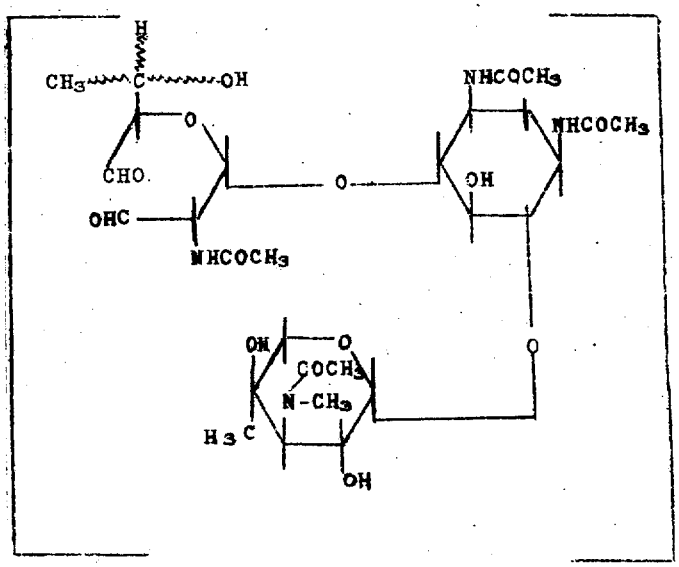

IA

B. 1,3,3'-Tri-N-Acetylgaramine

To the aqueous filtrate obtained in Example 1A, add 6.7 ml. of phenylhydrazine and 6.7 ml. of acetic acid followed by 170 ml. of water. Heat the solution of reflux temperature for one hour, or until thin layer chromatographic analysis on silica gel G.F. utilizing as developing solvent chloroform:methanol:ammonium hydroxide (1:1:1) indicates the absence of the starting material and the presence of mainly 1,3,3'-tri-N-acetylgaramine. Concentrate the reaction mixture in vacuo to a syrup, dissolve in 250 ml. of 2N ammonium

EXAMPLE 2

Preparation of 1,3,3'-tri-N-acetylgaramine From Per-N-Acetylgentamicin B

A. Periodate Oxidation of Tetra-N-Acetylgentamicin B

To 1,3,6',3''-tetra-N-acetylgentamicin B (150 mg., 0.3 mM) add a solution of sodium meta-periodate (99 mg., 0.462mM) in 20 ml. of water. Stir at room temperature until thin layer chromatographic analysis of an aliquot of the reaction solution indicates the absence of starting material. Add 30 ml. of a 1 percent solution of lead diacetate to the reaction mixture with stirring. Separate the resultant precipitate by filtration and cautiously add dropwise 2 ml. of 4 percent sulfuric acid. Separate the resultant precipitate of lead sulfate by filtration and evaporate the aqueous filtrate to a residue (211.5 mg.) comprising the tetra-N-acetylgentamicin B seco-dialdehyde product represented by the following structural formula 2A:

EXAMPLE 3

The Preparation of 1,3,3'-tri-N-acetylgaramine from per-N-acetylgentamicin $B_1$ A. In a manner similar to that described in Example 2A, treat 150 mg. of 1,3,6',3''-tetra-N-acetylgentamicin $B_1$ with 100 mg. of sodium metaperiodate. Isolate and purify the resultant product in a manner similar to that described to obtain a solution containing the tetra-N-acetylgentamicin $B_1$ seco-dialdehyde oxidation product represented by the fol-

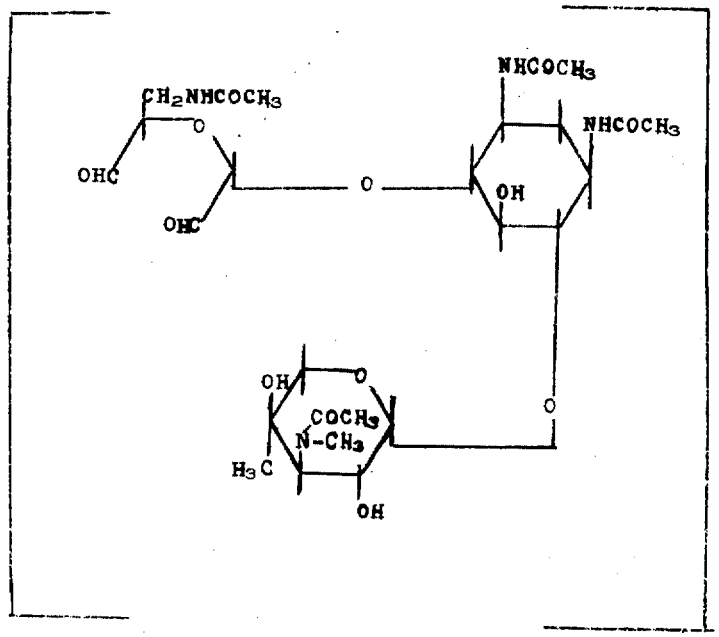

2A

B. 1,3,3'-Tri-N-Acetylgaramine

Dissolve the 211.5 mg. of oxidized product obtained in Example 2A in 25 ml. of water and add 1 ml. of phenylhydrazine and 1 ml. of acetic acid. Heat at reflux temperature for 1 hour or until thin layer chromatographic analysis on silica gel indicates the absence of starting material. Allow the reaction mixture to stand overnight at 25°C. Evaporate in vacuo to a residue, dissolve the residue in 2N ammonium hydroxide (50 ml.), extract the aqueous solution with two 50 ml. portions of chloroform, and evaporate the extracted aqueous layer to a residue comprising 1,3,3'-tri-N-acetylgaramine. Purify by dissolving the tri-N-acetylgaramine in methanol and treating with charcoal at room temperature for one hour, then at reflux temperature for five minutes. Filter, evaporate the methanolic solution to a residue, redissolve the residue in 0.5 ml. of methanol, then add dropwise 15 ml. of ether. Separate by filtration the resultant precipitate comprising 1,3,3'-tri-N-acetylgaramine (52.6 mg., 50.8% yield) $[\alpha]_D 26 + 100.3$ (0.3% in methanol).

lowing structural formula 3A wherein Z represents the 4-O-linked-per-N-acetylgaramine residue:

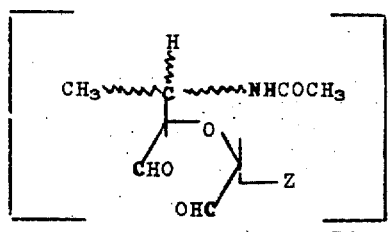

3A

B. In a manner similar to that described in Example 2B, treat the solution of tetra-N-acetylgentamicin $B_1$ dialdehyde oxidation product obtained as described above with phenylhydrazine and acetic acid in water. Isolate the resultant product in a manner similar to that described to obtain 1,3,3'-tri-N-acetylgaramine.

Purify by chromatographing over silica gel (8 g.) eluting with the lower phase of a chloroform:methanolconcentrated ammonium hydroxide system. Combine like fractions as determined by thin layer chromatography, then evaporate the combined fractions to obtain 1,3,3'-tri-N-acetylgaramine (23.5 mg., 23% theory).

EXAMPLE 4

Preparation of 1,3,3'-tri-N-acetylgaramine from Per-N-Acetylgentamicin $X_2$

A. Periodate oxidation of tetra-N-acetylgentamicin $X_2$

In a manner similar to that described in Example 1A, treat an aqueous solution of 1,3,2',3''-tetra-N-acetylgentamicin $X_2$ with sodium meta-periodate. When the reaction is complete as evidenced by thin layer chromatography, treat the reaction solution in a manner similar to that described to obtain an aqueous filtrate containing the seco-dialdehyde derivative of 1,-3,2',3''-tetra-N-acetylgentamicin $X_2$ represented by the following formula 4A wherein Z is a 4-O-linked per-N-acetylgaramine residue:

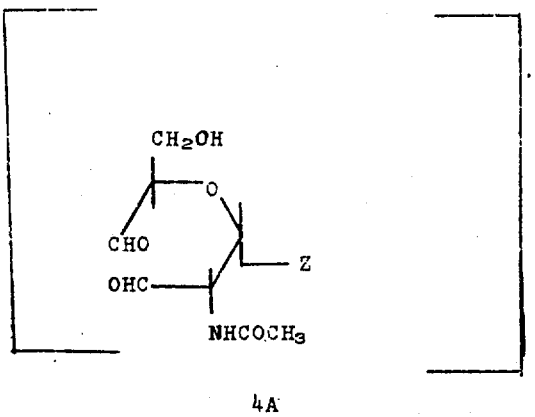

4A

B. 1,3,3'-Tri-N-Acetylgaramine

In a manner similar to that described in Example 1B, treat the aqueous filtrate obtained in Example 4A with phenyl hydrazine, acetic acid and water. Isolate and purify the resultant product in a manner similar to that described to obtain 1,3,3'-tri-N-acetylgaramine.

EXAMPLE 5

Preparation of 1,3,3'-Tri-N-acetylgaramine from a Mixture Comprising Tetra-N-acetylgentamicin B, tetra-N-acetylgentamicin $B_1$, and Tetra-N-acetylgentamicin X A. To a stirred solution of 17 g. of an N-acetylated gentamicin mixture (prepared as described in Preparation 1B) in 250 ml. of water, add 15 g. of sodium meta-periodate. Stir the solution overnight, then add a 10 percent aqueous solution of lead diacetate dropwise until no additional precipitate appears. Separate the resulting inorganic precipitation by filtration, then add 0.1N sulfuric acid until the filtrate is at pH 4-4.5. Separate the resultant precipitate of lead sulfate by filtration to obtain a filtrate containing a product mixture comprising the seco-dialdehyde derivative of gentamicins B, $B_1$ and $X_2$.

B. To the solution of the seco-dialdehyde product mixture obtained in above Example 5A, add 115 ml. of phenylhydrazine, 115 ml. of glacial acetic acid, then water, until the total volume of the reaction solution is 2 liters. Heat the reaction mixture at reflux temperature for 1 hour. Concentrate the reaction mixture to a syrupy residue, dissolve the residue in two liters of 2N-ammonium hydroxide, extract the ammonium hydroxide solution with three 280 ml. portions of chloroform, then concentrate the aqueous layer to a residue comprising 1,3,3'-tri-N-acetylgaramine. Chromatograph the residue on a 215 by 13 cm. column filled with 400 g. of silica gel previously conditioned by contact with the lower phase of a solvent mixture comprising chloroform:methanol:ammonium hydroxide (2:1:1). Dissolve the 1,3,3'-tri-N-acetylgaramine prepared as described in a minimum volume of the same chloroform:methanol:ammonium hydroxide (2:1:1) solvent mixture, pour the solution on the column, and elute with the same solvent mixture at a flow rate of 2 ml. per minute. Monitor the effluent by thin layer chromatography. Combine like fractions containing pure tri-N-acetylgaramine, and evaporate the combined eluates to a residue comprising 8.9 g. of 1,3,3'-tri-N-acetylgaramine.

EXAMPLE 6

Preparation of Tri-N-acetylgaramine from Antibiotics JI-20A, JI-20B, and JI-20 Complex A. The Periodate Oxidation of penta-N-acetylantibiotics JI-20A, JI-20B, and JI-20 Complex 1. In a manner similar to that described in Example 1A, treat an aqueous solution of 1 gm. of 1,3,2',6',3''-penta-N-acetylantibiotic JI-20A in 100 ml. of water with 1 equivalent of sodium meta-periodate. Stir the solution at room temperature until thin layer chromatographic analysis indicates the absence of starting material. Treat the reaction solution with 10 percent aqueous lead diacetate, then 0.1N sulfuric acid, and remove the resultant inorganic precipitate by filtration to obtain an aqueous solution containing the penta-N-acetylantibiotic-JI-20A seco-dialdehyde oxidation product represented by the following formula 6A(1) wherein Z is a 4-O-linked-tri-N-acetylgaramine residue:

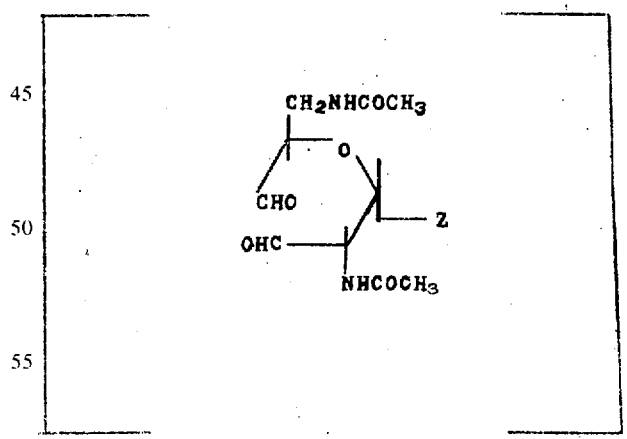

6A (1)

2. In similar manner, treat 1,3,2',6',3''-penta-N-acetylantibiotic JI-20B with sodium periodate in water, followed by treatment of the reaction mixture with aqueous lead diacetate, then 0.1N sulfuric acid. Isolate the resultant product in a manner similar to that described in above Example 6A(1) to obtain an aqueous solution containing penta-N-acetylantibiotic JI-20B dialdehyde oxidation product represented by the following formula 6A(2) wherein Z is a 4-O-linked-per-N-acetylgaramine residue:

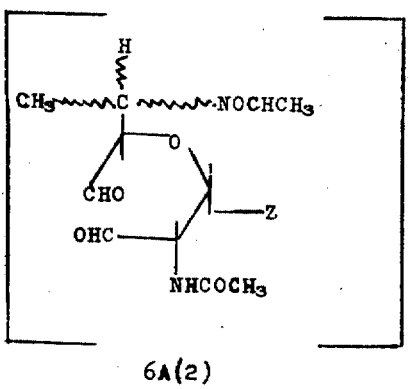

6A(2)

3. In similar manner, treat penta-N-acetylantibiotic JI-20 complex in water with sodium meta-periodate, followed by 10 percent aqueous solution of lead diacetate, then 0.1N sulfuric acid. Remove the resultant precipitate of lead sulfate by filtration to obtain an aqueous solution containing a seco-dialdehyde product mixture comprising the compounds of Examples 6A(1) and 6A(2).

B. 1,3,3'-Tri-N-acetylgaramine

Treat each of the aqueous filtrates obtained in Examples 6A(1), 6A(2) and 6A(3) containing the seco-dialdehyde derivatives of per-N-acetylantibiotics JI-20A, JI-20B, and JI-20 complex, respectively, with phenyl hydrazine in acetic acid and water in a manner similar to that described in Example 1B. Isolate and purify the resultant product in a manner similar to that described to obtain 1,3,3'-tri-N-acetylgaramine.

EXAMPLE 7

Preparation of 1,3,3'-tri-N-Benzoylgaramine

A. The Seco-dialdehyde Derivative of 1,3,6',3''-tetra-N-Benzoylgentamicin B

In a manner similar to that described in Example 2A, treat 1,3,6',3''-tetra-N-benzoylgentamicin B with sodium meta-periodate in water followed by treatment with 10 percent lead diacetate and then dilute sulfuric acid. Isolate and purify the resultant product in a manner similar to that described to obtain the seco-dialdehyde derivative of 1,3,6',3''-tetra-N-benzoylgentamicin B having the following structural formula 7A wherein R is benzoyl and Z represents the 4-O-linked-tri-N-benzoylgaramine residue:

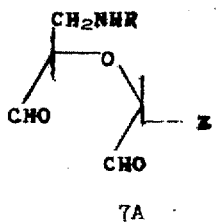

7A

B. 1,3,3'-Tri-N-Benzoylgaramine

In a manner similar to that described in Example 2B, treat the seco-dialdehyde derivative of tetra-N-benzoylgentamicin B dissolved in water with phenyl hydrazine and acetic acid. Isolate and purify the resultant product in a manner similar to that described to obtain 1,3,3'-tri-N-benzoylgaramine.

In similar manner, subject the following per-N-benzoyl derivatives to the procedures of Example 7A and 7B to obtain 1,3,3'-tri-N-benzoylgaramine:

1,3,6',3''-tetra-N-benzoylgentamicin $B_1$;
1,3,2',3''-tetra-N-benzoylgentamicin $X_2$;
a mixture of tetra-N-benzoylgentamicin B, $B_1$ and $X_2$;
1,3,2', 3''-tetra-N-benzoylantibiotic G-418;
1,3,2',6''-penta-N-benzoylantibiotic JI-20A;
1,3,2',6''-penta-N-benzoylantibiotic JI-20B and mixtures thereof; and
1,3,2',6',3''-penta-N-benzoylantibiotic JI-20 complex.

EXAMPLE 8

GARAMINE

1. Heat 500 mg. of 1,3,3'-tri-N-acetylgaramine in 25 ml. of 4N sodium hydroxide in a sealed vessel at 110°C for 96 hours. Pass the solution through a column of IRC-50 resin ($NH_4^+$ cycle). Wash the column with two column volumes of water followed by 0.1N ammonium hydroxide. Monitor the fractions by thin layer chromatography, combine the like fractions containing garamine, and evaporate to a residue comprising garamine.

In similar manner, treat 1,3,3'-tri-N-benzoylgaramine and 1,3,3'-tri-N-carbobenzyloxygaramine with aqueous sodium hydroxide and isolate and purify the resultant product as described hereinabove to obtain garamine.

I claim:

1. The process for preparing a garamine derivative having amino-protecting groups selected from the group consisting of lower alkanoyl, aroyl and aralkanoyl, which comprises treating a pseudotrisaccharide having a garamine moiety 4-Q-glycosidically linked to another pyranoside sugar which possesses an amino function and vicinal hydroxyl groups, said pseudotrisaccharide having amino-protecting groups selected from the group consisting of lower alkanoyl, aroyl and aralkanoyl, with a glycol cleaving reagent selected from the group consisting of a periodate salt and a lead (IV) salt; and treating the seco-dialdehyde intermediate with a hydrazine and a lower, alkanoic acid in water, said hydrazine being a phenylhydrazine.

2. The process of claim 1 wherein said pseudotrisaccharide has a garamine moiety 4-Q-glycosidically linked to another pyranoside sugar with possesses an amino function and vicinal trans diequatorial hydroxyl groups, and wherein said pseudotrisaccharide has amino-protecting groups selected from the group consisting of lower alkanoyl and aroyl having up to 8 carbon atoms.

3. The process of claim 2 followed by the step of treating the garamine derivative with alkali whereby garamine is formed.

4. The process of claim 2 for preparing an amino-protected garamine derivative represented by the following structural formula I:

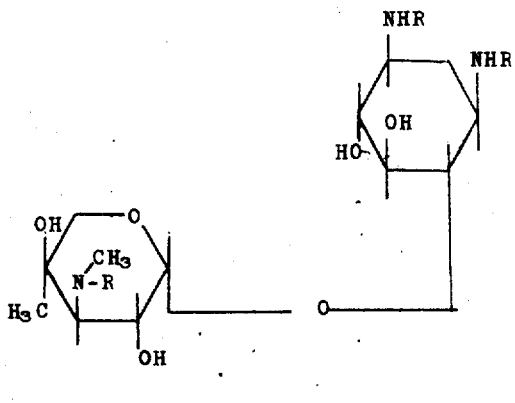

I wherein R is an amino-protecting group selected from the group consisting of lower alkanoyl and aroyl having up to 8 carbon atoms; which comprises treating a pseudotrisaccharide selected from the group consisting of a compound represented by the following formula II and mixtures thereof:

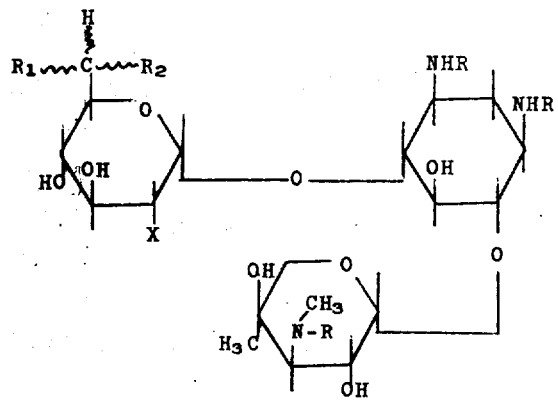

II wherein R is as hereinabove defined; $R_1$ is a member selected from the group consisting of hydrogen and methyl, $R_2$ and X are each a member selected from the group consisting of —NHR and hydroxy;
  with a glycol cleaving reagent selected from the group consisting of a periodate salt and a lead salt; and treating the seco-dialdehyde intermediate selected from the group consisting of a compound represented by the following structural formula III and mixtures thereof:

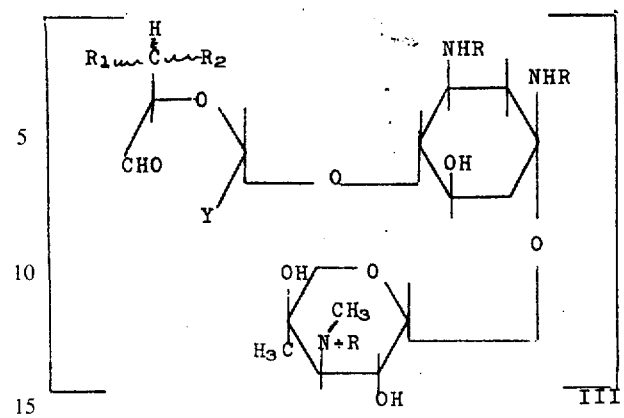

III wherein R, $R_1$ and $R_2$ are as hereinabove defined, and Y is a member selected from the group consisting of

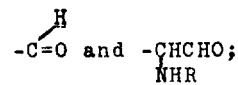

with a hydrazine and a lower alkanoic acid in water, said hydrazine being a phenylhydrazine.

5. The process of claim 4 wherein R is benzoyl.
6. The process of claim 4 wherein R is acetyl.
7. The process of claim 4 wherein said glycol cleaving reagent is an alkali metal meta-periodate, said hydrazine is phenylhydrazine, and said lower alkanoic acid is acetic acid.
8. The process of claim 4 wherein said pseudotrisaccharide is a compound of formula II or a mixture thereof, wherein R is acetyl; said glycol cleaving reagent is sodium meta-periodate; said hydrazine is phenylhydrazine, and said lower alkanoic acid is acetic acid, whereby is formed 1,3,3'-tri-N-acetylgaramine.
9. The process of claim 8 wherein said pseudotrisaccharide represented by formula II is 1,3,2',3''-tetra-N-acetylantibiotic G-418.
10. The process of claim 8 wherein said pseudotrisaccharide represented by formula II is 1,3,6',3''-tetra-N-acetylgentamicin $B_1$.
11. The process of claim 8 wherein said pseudotrisaccharide starting compound is a mixture comprising 1,3,2',6',3''-penta-N-acetylantibiotic JI-20A and 1,3,2',6',3''-penta-N-acetylantibiotic JI-20B.
12. The process of claim 8 wherein said pseudotrisaccharide represented by formula II is 1,3,2',6',3''-penta-N-acetylantibiotic JI-20B.
13. The process of claim 8 wherein said pseudotrisaccharide starting compound is a mixture comprising 1,3,6',3''-tetra-N-acetylgentamicin B, 1,3,6',3''-tetra-N-acetylgentamicin $B_1$ and 1,3,2',3''-tetra-N-acetylgentamicin $X_2$.
14. The process of claim 8 followed by the steps of treating the 1,3,3'-tri-N-acetylgaramine with alkali and isolating garamine.

* * * * *

UNITED STATES PATENT OFFICE
CERTIFICATE OF CORRECTION

PATENT NO. : 3,879,375
DATED : April 22, 1975
INVENTOR(S) : Peter J. L. Daniels

It is certified that error appears in the above-identified patent and that said Letters Patent are hereby corrected as shown below:

Column 4, line 38, "with lead to acetate and," should read ---with lead acetate and,---. Column 4, line 40, "to about pH$^4$." should read ---to about pH 4.---. Column 6, line 24, "of formula II" " should read ---of formula III"---. Column 6, line 40, "NRRI 2953" should read ---NRRL 2953---. Column 6, lines 48 and 49, "and 1,3,2',6",3" " should read ---and 1,3,. 2',6',3"- ---. Column 7, line 23, "on silica ge" should read ---on silica gel---. Column 7, line 39, "$[\alpha]_D$ 26 + " should read ---$[\alpha]_D^{26}$ + ---. Column 7, line 41, "$[\alpha]_D$ 26" should read ---$[\alpha]_D^{26}$ ---. Column 8, line 1, "$[\alpha]_D$ 26 + " should read ---$[\alpha]_D^{26}$ + ---. Column 8, line 13, "$[\alpha]_D$ 26 + " should read $[\alpha]_D^{26}$ + ---. Column 8, lines 14 and 15, "1,3,2', 6',3"-$[\alpha]_D$ 26 + 130° (water)" should read ---1,3,2',6',3"-$[\alpha]_D^{26}$ + 130° (water)---. Column 8, line 48, "chloride a pyridine" should read ---chloride in pyridine---. Column 9, line 18, "about ph 4" should read ---about pH 4---. Column 9, line 59, "the solution of reflux" should read ---the solution at reflux---. Column 10, line 22, "$[\alpha]_D$ 26 + " should read ---$[\alpha]_D^{26}$ + ---. Column 11, line 64, "$[\alpha]_D$ 26 + " should read ---$[\alpha]_D^{26}$ + ---. Column 16, line 10, "1,3,2',6"-penta" should read ---1,3,2',6'-penta---. Column 16, line 11, "1,3,2',6"-penta" should read ---1,3,2',6',3"-penta---. Column 16, line 43, "4-Q-glycosidically" should read ---4-O-glycosidically---. Column 16, line 55, "4-Q-glycosidically" should read ---4-O-glycosidically---. Column 16, line 56, "sugar with possesses" should read ---sugar which possesses---.

Signed and Sealed this thirteenth Day of January 1976

[SEAL]

Attest:

RUTH C. MASON
Attesting Officer

C. MARSHALL DANN
Commissioner of Patents and Trademarks